(12) United States Patent
Colombo et al.

(10) Patent No.: US 7,386,007 B2
(45) Date of Patent: Jun. 10, 2008

(54) METHOD AND APPARATUS FOR MAPPING FAST ETHERNET DATA INTERFACES INTO A SINGLE VC-4 VIRTUAL CONTAINER OF A STM-1/OC-3 PAYLOAD TRANSMITTED IN A RADIO-LINK SYSTEM

(75) Inventors: Claudio Colombo, Biassono (IT);
Silvio Cucchi, Gaggiano (IT); Primo Garofoli, Milan (IT)

(73) Assignee: ALCALTEL, Paris (FR)

( * ) Notice: Subject to any disclaimer, the term of this patent is extended or adjusted under 35 U.S.C. 154(b) by 893 days.

(21) Appl. No.: 10/107,045

(22) Filed: Mar. 28, 2002

(65) Prior Publication Data

US 2002/0176389 A1    Nov. 28, 2002

(30) Foreign Application Priority Data

Apr. 5, 2001    (IT)    .......................... MI2001A0726

(51) Int. Cl.
*H04J 3/16*    (2006.01)
*H04J 3/22*    (2006.01)
*H04L 12/28*    (2006.01)

(52) U.S. Cl. .................. 370/466; 370/907; 370/401

(58) Field of Classification Search ............... 370/338, 370/445, 310–350, 473, 474
See application file for complete search history.

(56) References Cited

U.S. PATENT DOCUMENTS

| | | | | |
|---|---|---|---|---|
| 5,805,568 A * | 9/1998 | Shinbashi | .................... | 370/223 |
| 6,014,708 A * | 1/2000 | Klish | .......................... | 709/232 |
| 6,058,119 A * | 5/2000 | Engbersen et al. | ......... | 370/466 |
| 6,122,281 A * | 9/2000 | Donovan et al. | ........... | 370/401 |
| 6,236,660 B1 * | 5/2001 | Heuer | ........................ | 370/409 |
| 6,266,333 B1 * | 7/2001 | Kartalopoulos | ........ | 370/395.53 |
| 6,353,609 B1 * | 3/2002 | Ethridge et al. | ............ | 370/352 |
| 6,414,966 B1 * | 7/2002 | Kulkarni et al. | ............ | 370/465 |
| 6,510,163 B1 * | 1/2003 | Won | ........................... | 370/466 |
| 6,584,118 B1 * | 6/2003 | Russell et al. | .............. | 370/466 |
| 6,813,279 B1 * | 11/2004 | Trainin | ....................... | 370/466 |
| 6,816,510 B1 * | 11/2004 | Banerjee | ..................... | 370/503 |
| 6,963,561 B1 * | 11/2005 | Lahat | .......................... | 370/356 |
| 7,227,844 B1 * | 6/2007 | Hall et al. | .................. | 370/242 |
| 7,286,564 B2 * | 10/2007 | Roberts | ....................... | 370/472 |
| 7,305,014 B2 * | 12/2007 | Kirk et al. | ................... | 370/539 |
| 2002/0089715 A1 * | 7/2002 | Mesh et al. | ................. | 359/118 |
| 2002/0176450 A1 * | 11/2002 | Kong et al. | ................. | 370/539 |
| 2005/0122969 A1 * | 6/2005 | Nigam et al. | ............... | 370/386 |

* cited by examiner

*Primary Examiner*—Kwang Bin Yao
*Assistant Examiner*—Warner Wong
(74) *Attorney, Agent, or Firm*—Sughrue Mion, PLLC (57) ABSTRACT

Described is a method and apparatus for mapping Fast Ethernet data interfaces (in addition to possible data interfaces of different type) into a single VC-4 Virtual Container of a STM-1/OC-3 payload transmitted to a radio-link system. The method is characterized by the steps of: packeting the Fast Ethernet signal and any other signal, mapping the packets into a single (VC-4) Virtual Container of a STM-1/OC-3 payload of a SDH/SONET signal frame, and transmitting said signal frame through the point-to-point radio-link, said radio link being a point-to-point SDH/SONET radio link. All the packets have the same format and are associated to a header for identifying the source. The interfaces of different type are conveniently grouped. Possibly, the VC-4 is filled with null packets to exhaust the maximum available capacity.

17 Claims, 8 Drawing Sheets

METHOD AND APPARATUS FOR MAPPING FAST ETHERNET DATA INTERFACES INTO A SINGLE VC-4 VIRTUAL CONTAINER OF A STM-1/OC-3 PAYLOAD TRANSMITTED IN A RADIO-LINK SYSTEM

This application is based on, and claims the benefit of, Italian Patent Application No. MI2001A000726 filed on Apr. 5, 2001, which is incorporated by reference herein.

BACKGROUND OF THE INVENTION

1. Field of the Invention

The present invention relates to the field of telecommunications and in particular to the point-to-point radio-link communication systems. More in detail, it relates to a method and the respective apparatus for mapping Fast Ethernet interfaces (and possible data interfaces of different type) into a single Virtual Container of a STM-1 (or OC-3) payload transmitted to a point-to-point radio link system.

2. Description of the Prior Art

The present telecommunication networks try to maintain an optimized connection from the point of view of data and by an optimal exploitation of the available bandwidth in view of a geographical expansion of activities and the continuous increase of bit rates of IP (Internet Protocol) transmission. The bottleneck of the so-called "last mile" between the business LAN networks and the public networks is still limiting the business productivity and the profits of network service providers (NSP).

So far, the connection between local networks (LAN) and public networks was carried out substantially through optical fiber lines, dedicated lines or wireless systems designed to transmit voice signals. All these known connection systems have several disadvantages. For example, they provide high costs, delays in the physical cable laying, fees to be paid, contract restrictions and technical limitations reducing the business production capacity.

In addition to the traditional structures (Ethernet), based on a bus topology, utilized to interconnect computers in a local area network (LAN), it is well known the so-called "Fast Ethernet". The Fast Ethernet has now become a finally ratified Standard by the Institute of Electrical and Electronics Engineers (IEEE). To this Standard has been awarded the official name "802.3u" but it is more known with the name "100BASE-T" (it does not refer to the cable used but to the utilization manner of the cable itself). The 100BASE-T has a transmission bit-rate equivalent to 100 Mb/s and utilizes the CSMA/CD (Carrier Sense Multiple Access/Collision Detection) method to manage the access to the cable.

The existing solutions, both via cable and wireless, for interconnecting two LAN networks are considered as inadequate in particular in the presence of a 100 Mb/s transmission bit-rate.

SUMMARY OF THE INVENTION

The object of the present invention is to offer a valid alternative to the existing solutions to implement an optimized LAN to LAN connection. In particular, the main object of the present invention is to provide a method for mapping Fast Ethernet data interfaces into a single Virtual Container of a STM-1/OC-3 payload transmitted to a radio-link system.

A further object is to let the Fast Ethernet signal of a first LAN, the Fast Ethernet signal being mapped and possibly transmitted through a SDH radio-link, travel within a SDH/SONET (ring) network so that it reaches a second LAN, possibly through another SDH radio-link.

The basic idea of the present invention is to encapsulate several data streams (Fast Ethernet (at 100 Mb/s) and low-level plesiochronous interfaces, namely E1 (at 2 Mb/s) or DS1 (at 1.5 Mb/s)) within the VC-4 of the payload of a STM-1 (or OC-3) signal and, in addition, to recover the clock signal at the receiver through information transmitted together with the same STM-1 frame.

According to the present invention, the (VC-4) Virtual Container is not created in a conventional manner but through a "packeting" step, as hereunder detailed.

The present invention will become clear thanks to the hereinafter detailed description, supplied by way of a non-limiting example, as set forth in the appended Figures.

BEST MODE FOR CARRYING OUT THE INVENTION

Before describing the present invention, it is imperative to say that it is equally applicable to all the synchronous signals, such as SDH and SONET. Therefore, each reference made to the SDH domain is automatically understood as extended to the SONET world and vice versa.

Figure 1:
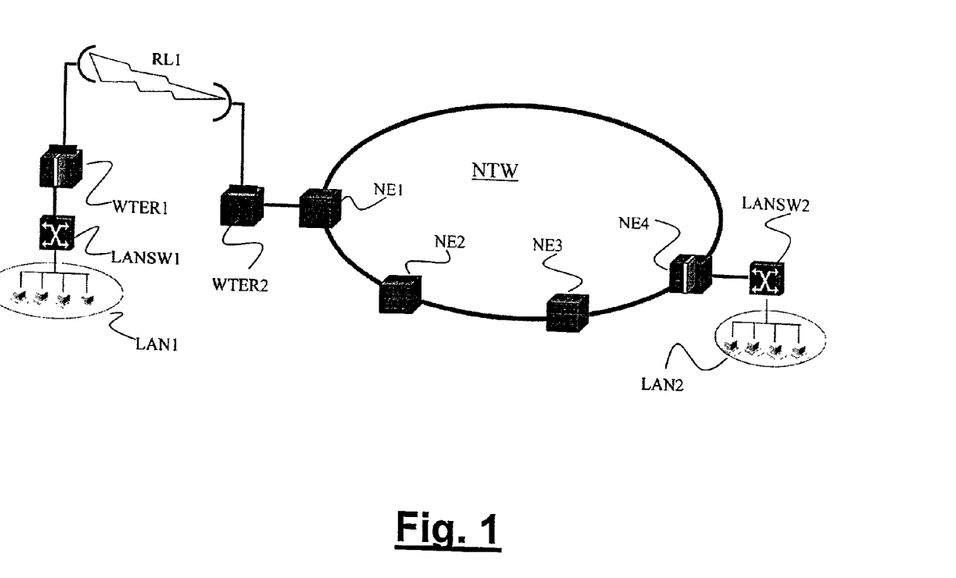
FIG. 1 illustrates a first network application of the present invention.

FIG. 1 shows a first possible network application of the present invention to interconnect two local area networks, LAN1 and LAN2. A Fast Ethernet signal coming from a first local network (LAN1) is processed into a LAN Switch LANSW1, mapped (WTER1) into SDH/SONET Virtual Containers (VC4) and transmitted through a point-to-point SDH/SONET radio-link. At the reception side WTER2 of the radio-link, the frame created is inserted (NE1) and transported through a conventional (ring) SDH/SONET network, indicated by NTW. At node NE4 of the (ring) network, the frame is de-mapped and the signal is converted again into the original Fast Ethernet signal through a second LAN Switch LANSW2. Later, it is sent to the second local area network LAN2.

Figure 2:
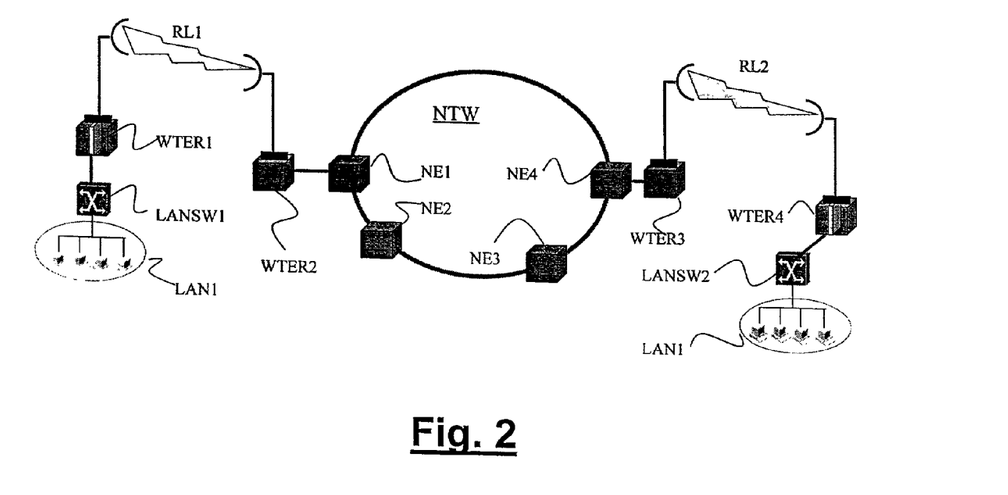
FIG. 2 illustrates a second network application of the present invention.

The application of FIG. 2 is very similar to the application of FIG. 1. The difference is in the fact that a second point-to-point SDH/SONET radio-link is implemented to accede to the second local area network LAN2. In each case, we could generically define both the applications as "LAN-to-LAN interconnections".

The problem that is addressed and solved by the present invention is transmitting a Fast Ethernet signal through a SDH/SONET radio-link. Since the Fast Ethernet signal has been properly "packeted" in order to be contained into the standard SDH/SONET Virtual Containers (VC-4), it can be easily transmitted through conventional (ring) SDH/SONET networks.

Figure 3:
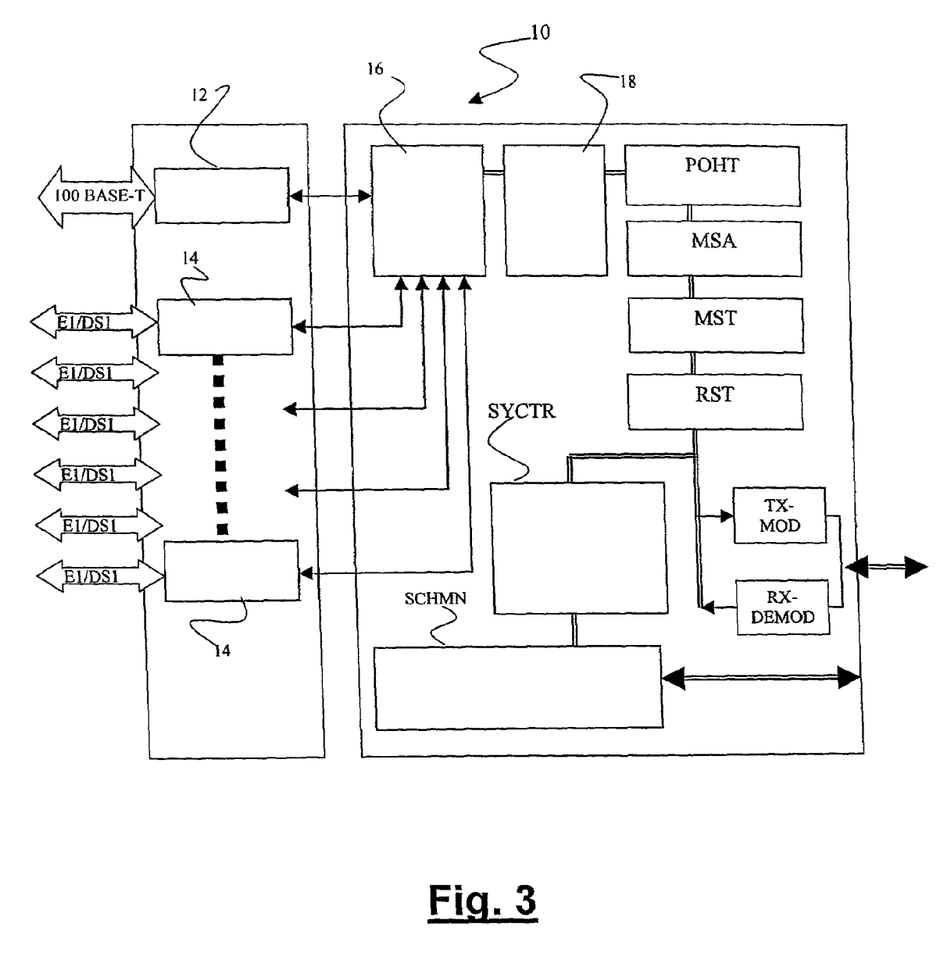
FIG. 3 illustrates a schematical block diagram of a single wireless terminal implementing the present invention.

FIG. 3 illustrates a schematical block diagram of a single wireless terminal 10 implementing the present invention. FIG. 3 shows a first I/O interface 12 for Fast Ethernet (100BASE-T) signals and a plurality of I/O interfaces 14 for plesiochronous signals, typically E1 signals at 2 Mb/s or DS1 signals at 1.5 Mb/s. The maximum number of I/O interfaces 14 for plesiochronous signals is depending on which signal (E1, DS1) they are fit to receive and is limited only by the standardized capacity (149 Mb/s) of a VC-4 Virtual Container.

All the I/O interfaces 12, 14 are into a bidirectional communication with a packet building block 16 which acts as a "Round-Robin Scheduler". The packet building block 16 is in its turn connected to a block 18 for SDH/SONET frame processing and mapping. Conventionally, once the VC-4 Virtual Container has been built, SDH/SONET functional blocks are provided. In other words, all the termination sections of SDH/SONET are present, namely: POHT, the termination section of VC-4 POH; MSA, the section for adapting the AU-4 to the MS (Multiplex Section); MST, the MSOH termination section; and RST, the RSOH termination section. The radio terminal according to the present invention further comprises a system controller SYCTR and modulation blocks TXMOD (for transmission side) and demodulation blocks RXDEMOD (for reception side) which are connected to a conventional microwave transceiver (not shown). Possibly, a block SCHMN for the management of service channels and outer interfaces is provided.

The present invention is based on the principle of multiplexing data interfaces of different type into a single VC-4. The incoming signals (100BASE-T, E1, DS1) are divided into packets having a fixed length which are "stacked", that is temporary stored with a pre-established number. A time-division scheduler checks that the packet stacks from the sources be complete (in principle, the various signals could arrive with different bit rates). In the positive case, it is possible to build, that is to fill, a VC-4 Virtual Container. In the negative case, there are two alternatives: a VC-4 Virtual Container is constructed in any case by using "null" packets or the completion of the stack of valid packets is awaited.

Naturally, each packet stack from the same source is associated with a label or header identifying the source itself (for example 100BASE-T, first group of E1/DS1 signals or second group of E1/DS1 signals) in order to recover the original signal at the receiving side. The header, substantially, comprises a string for identifying the type of signal inserted into the VC-4.

In the preferred embodiment of the present invention, with a signal at 100 Mb/s and six signals at 2 (or 1.5) Mb/s, four different headers are foreseen: a first header for the source at 100 Mb/s, a second header for a first block of three signals at 2 (or 1.5) Mb/s, a third header for a second block of three signals at 2 (or 1.5) Mb/s and a fourth header to identify possible null packets. This because, as better explained hereinafter, the various signals at 2 (or 1.5) Mb/s are multiplexed at groups of three into a "super block". After having identified the null packets by an appropriate header, they shall be easily eliminated during the reception without running the risk of loosing a part of the useful signal.

The present invention comprises the steps of dividing the signals (whichever the origin source could be) into packets having a pre-established length. The optimal packet length is equal to 28 bytes (27 bytes for information and 1 byte for header) for reasons that will become clear hereunder. Therefore, the maximum number of 28-bytes packets to be inserted into a VC-4 shall be 83. The residual 16 bytes of the VC-4 shall be utilized for clock recovery (the below described mechanism of time stamping).

The composition of a frame (single VC-4) in the case of a single source at 100 Mb/s will be as indicated in the below Table 1:

TABEL 1

| Interface | No. of packets | No. bytes |
| --- | --- | --- |
| 100BASE-T | 72 ÷ 73 | 1944 ÷ 1971 |
| "Null" packets | 10 ÷ 11 | 270 ÷ 297 |

The number of bytes reserved to the headers shall be 83, the ones reserved to the timestamp shall be 16.

The composition of a frame in the case of a Fast Ethernet source and of six sources at 2.0 (or 1.5) Mb/s will be as indicated in the below table:

TABLE 2

| Interface | No. of packets | No. bytes |
| --- | --- | --- |
| 100BASE-T | 72 ÷ 73 | 1944 ÷ 1971 |
| 1st block (3 X E1 or DS1) | 4 | 108 |
| 2nd block (3 X E1 or DS1) | 4 | 108 |
| "Null" packets | 2 ÷ 3 | 54 ÷ 81 |

The number of bytes reserved to the headers shall be still 83, the ones reserved to the timestamp shall be 16.

Figure 6:
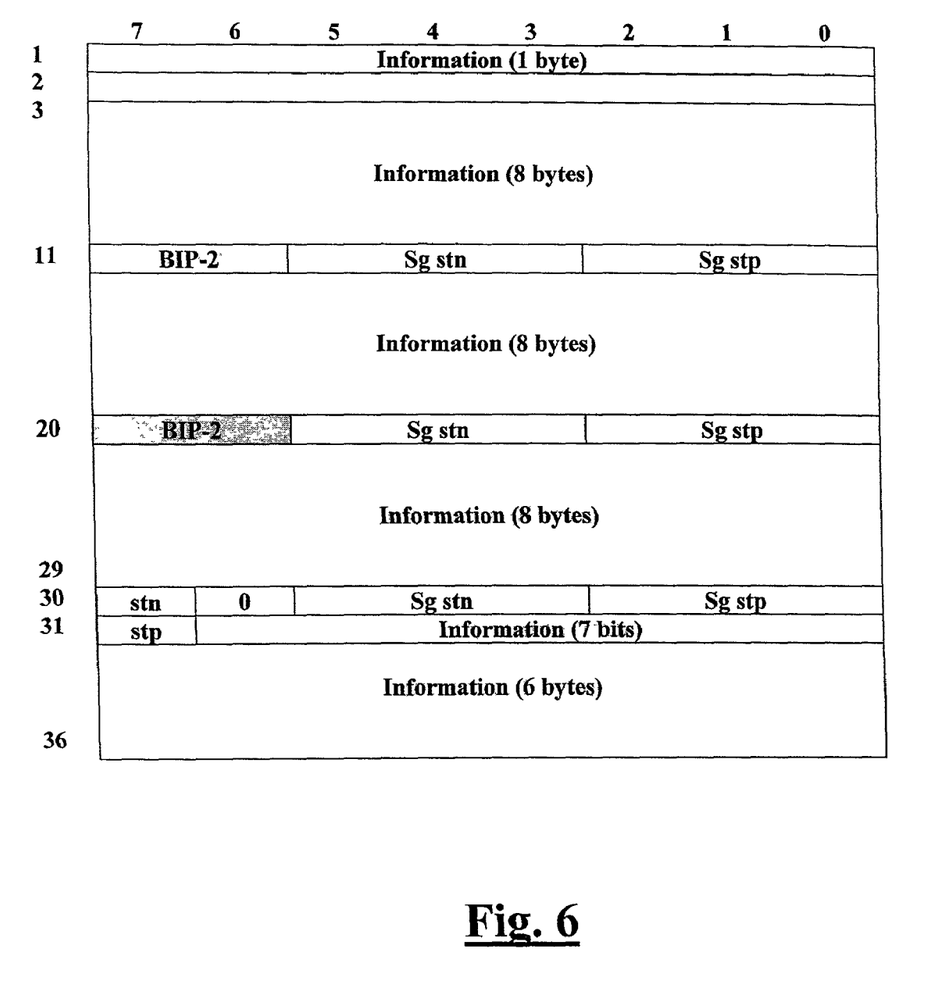
FIG. 6 illustrates how it could be mapped a single channel at 2 (or 1.5) Mb/s onto a Virtual Container of 36 bytes.

For example, a signal at 2 (or 1.5) Mb/s is mapped onto a WST Virtual Container of 36 bytes as shown in FIG. 6, wherein:

BIP-2 contains a dedicated parity control;
Sg stn represents a negative stuffing signal;
Sg stp represents a positive stuffing signal;
Stn is a negative stuffing; and
Stp is a positive stuffing.

Three of these structures of 36 bytes are byte-by-byte multiplexed into a super block of 108 bytes (3×36 bytes) which, with the addition of the respective headers, are equivalent to four blocks of 28 bytes each.

Figure 7:
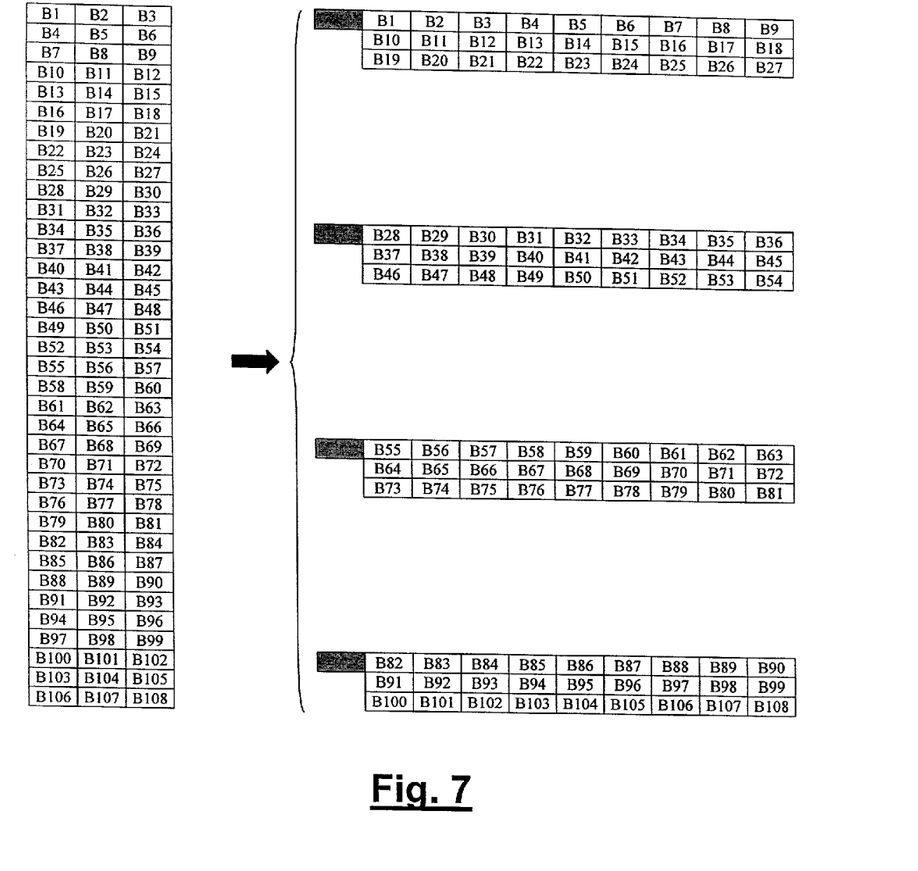
FIG. 7 illustrates how it is possible to perform the packeting of channels at 2 (or 1.5) Mb/s.

Indeed, as the man skilled in the art will realize, a signal at 2 (or at 1.5) Mb/s could be contained also into 32 bytes only, notwithstanding the bytes of stuffing and parity control. Nevertheless, the same man skilled in the art shall recognize that 36 is also a multiple of the number of columns of a SDH/SONET frame and the multiplexing of three Virtual Containers of 36 bytes each (for a total of 108 bytes) is an exact multiple of four packets of 28 bytes as above defined and shown in FIG. 7; for sure, this fact is advantageous. In FIG. 7, the gray coloured byte indicates the packet header.

In the present invention, particular attention has been paid to the clock recovery since a source of asynchronous signals (100 Mb/s) is managed with the frame. The mechanism for recovering the synchronism signal is contained, as hereunder explained, in the SDH/SONET frame built through the packets from the various sources.

At the transmission side, a counter is provided for performing a sampling step and inserting, for instance at the end of the frame, an indicator (progressive number) proportional to the sampling frequency. At the reception side, this indicator is used for modifying the frequency of a voltage controlled oscillator (VCO) allowing to read the incoming data. Then, in each frame, a numerical indicator of the frequency by which the sampling has been carried out is contained.

Figure 4:
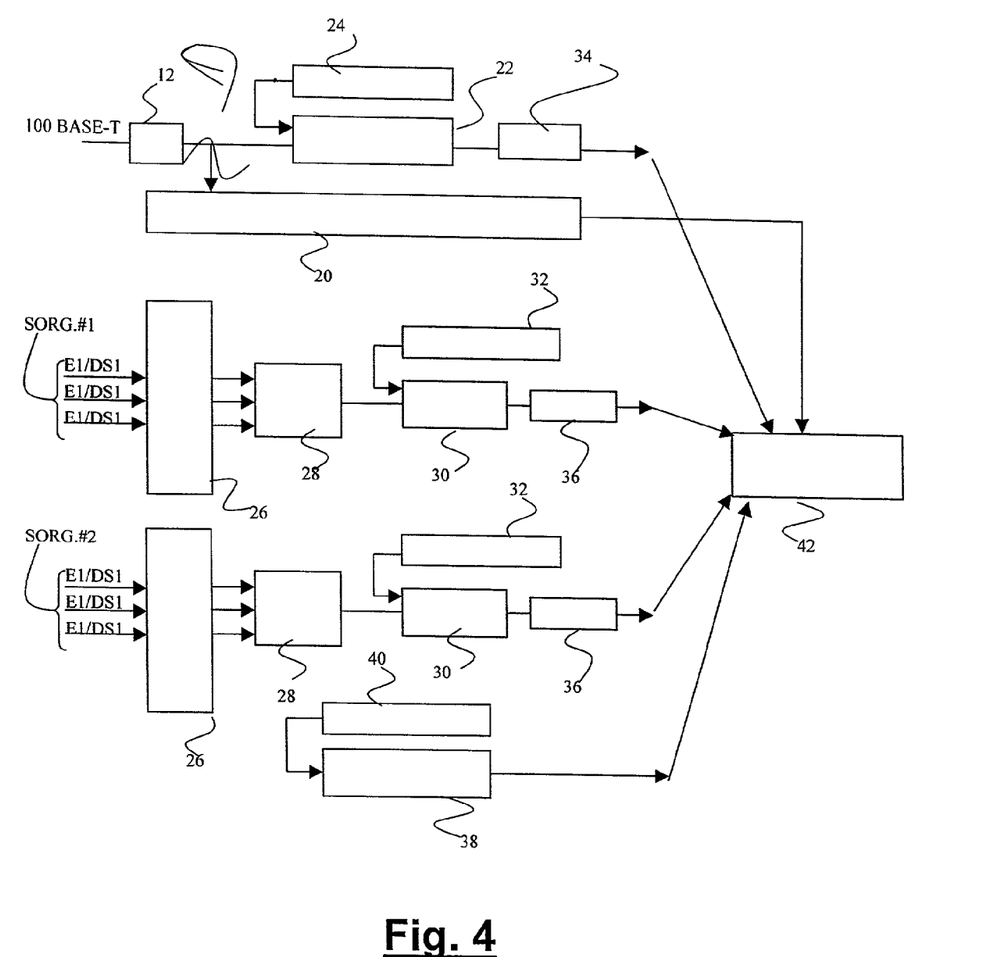
FIG. 4 illustrates, schematically, a transmitter according to the present invention.

In FIG. 4 a transmitter according to the present invention is schematically shown, the transmitter being able to receive signals of different type (100 BASE-T, E1, DS1) and to map them in an appropriate manner into a VC-4 of SDH/SONET frames. It is assumed that the incoming signals be a 100 BASE-T signal and six E1 (or DS1) signals.

The Time-Stamp is assigned (20) to the received 100 BASE-T signal in order to obtain the correct clock information at the receiving side. Packets having a fixed length are formed (22) and a header is added (24). The so formed packets are stacked into a buffer 34.

The signals E1, DS1 are received in groups of three signals. They are mapped (26) onto respective containers of 3×36 bytes. The containers of 108 bytes are multiplexed (28). As for the 100 BASE-T signal, packets are formed (30) and an appropriate header is added (32) to identify the origin source. Also in this case, the so formed packets are stacked (36) into a proper memory. Because of the above said reasons, void or null packets are formed (38) and also to these null packets, having the same format of the valid packets, a proper header is added (40). A scheduler 42 forms a VC-4 Virtual Container, by utilizing the packets taken from the various buffers 34, 36 and possibly by using a certain number of null packets.

Figure 5:
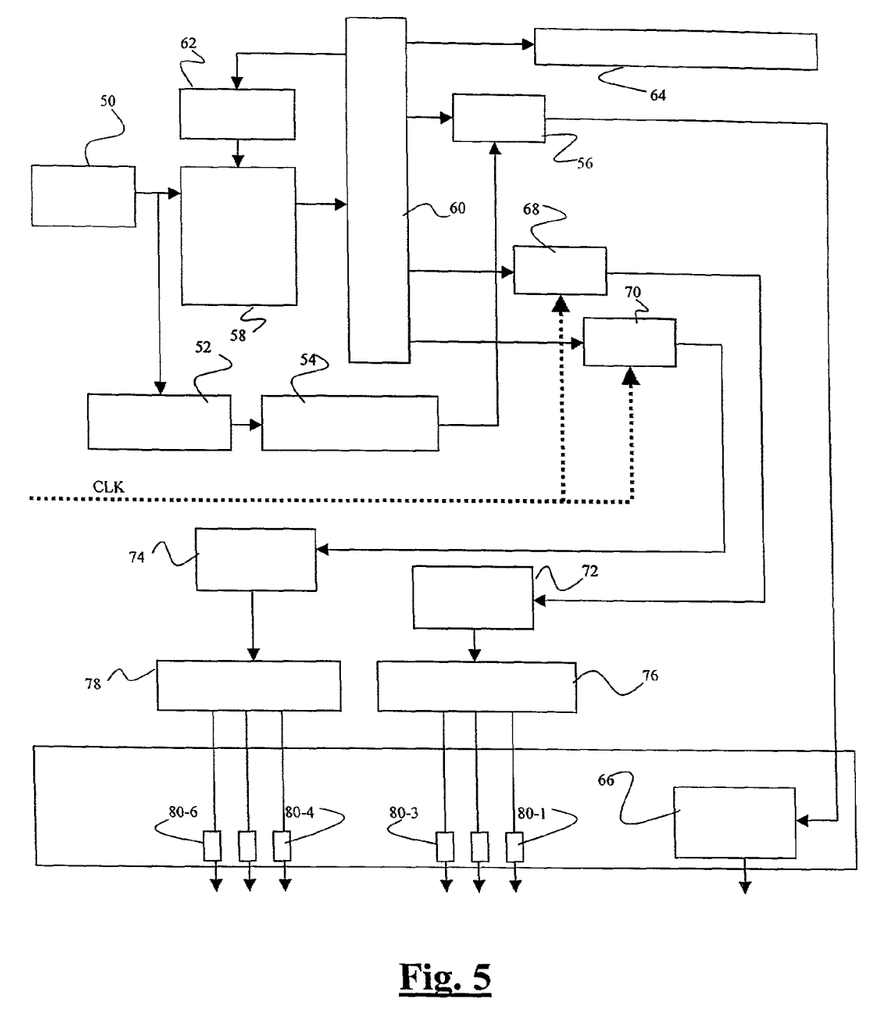
FIG. 5 illustrates, schematically, a receiver according to the present invention.

In FIG. 5 is schematically shown a receiver according to the present invention which is able to receive SDH/SONET frames and, from these, to extract the original signals (100 BASE-T, E1, DS1) transmitted through the radio link. The SDH/SONET frame is received through a proper input interface 50. From the received frame, the time stamp for clock recovery (54) is extracted (52). The so recovered clock signal is forwarded to a buffer (56) that stores the packets of the Fast Ethernet signals. The received frame is stored into a memory 58 and later processed by a block 60 for the identification of packet headers. The memory 58 is controlled by an appropriate controller 62, which is also in communication with the header identification block.

The block 60 for the header identification reads and identifies the headers of the packets contained in the payload of the frame. In the case of identification of a header of null packets, all the packets identified by this header shall be rejected (64). If a packet header of a 100BASE-T signal is identified, the packets identified by this header shall be sent (in the exact order of reception) to the buffer 56 and later to an output interface 66 for signals at 100 Mb/s. If a header of a first (or second) block of E1 or DS1 signals is identified, the packets identified by this header shall be sent to a first -68- (or second -74-) buffer of E1/DS1 signals to form a first -72- (or second -74-) container of 108 bytes (3×36 bytes). The respective first (or second) container of 108 bytes is demultiplexed (76, 78) and the E1/DS1 signals obtained shall be sent to the respective output interfaces 80.

Figure 8:
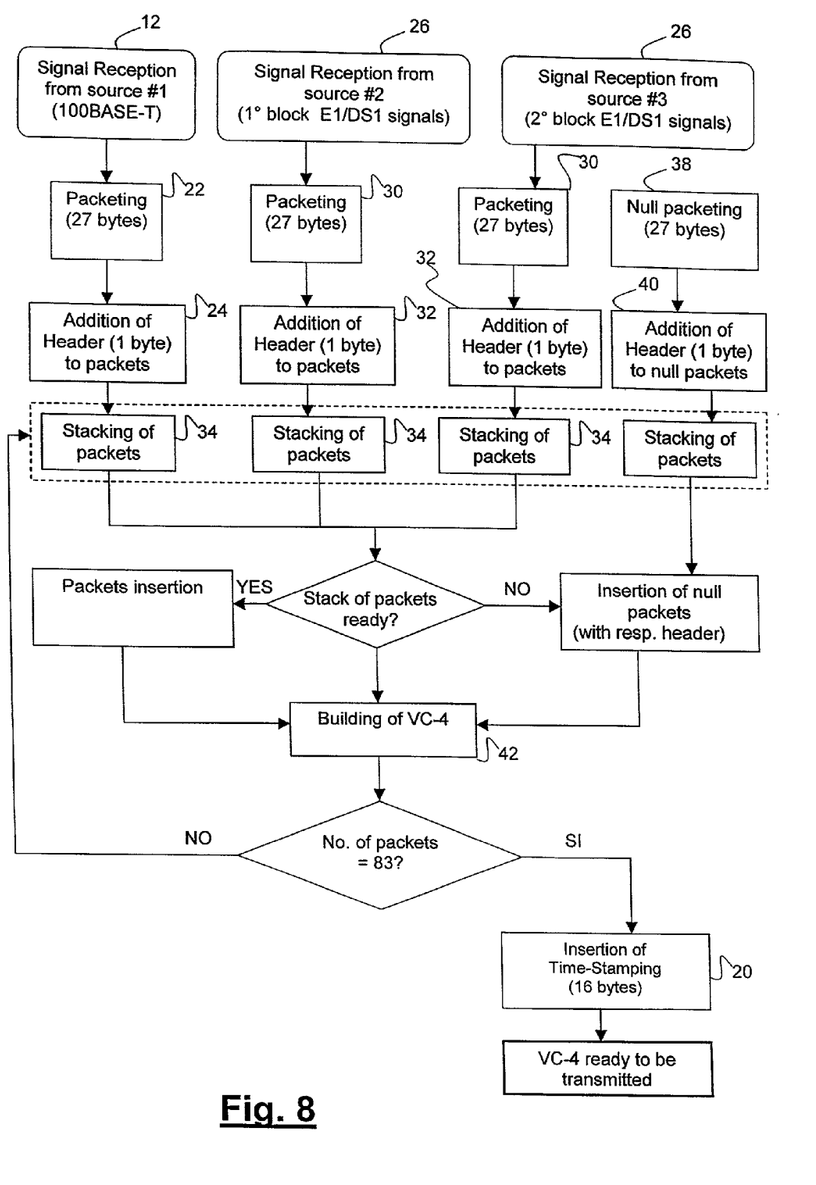
FIG. 8 illustrates a flow-chart of the various steps of the method carried out during the transmission.
Figure 9:
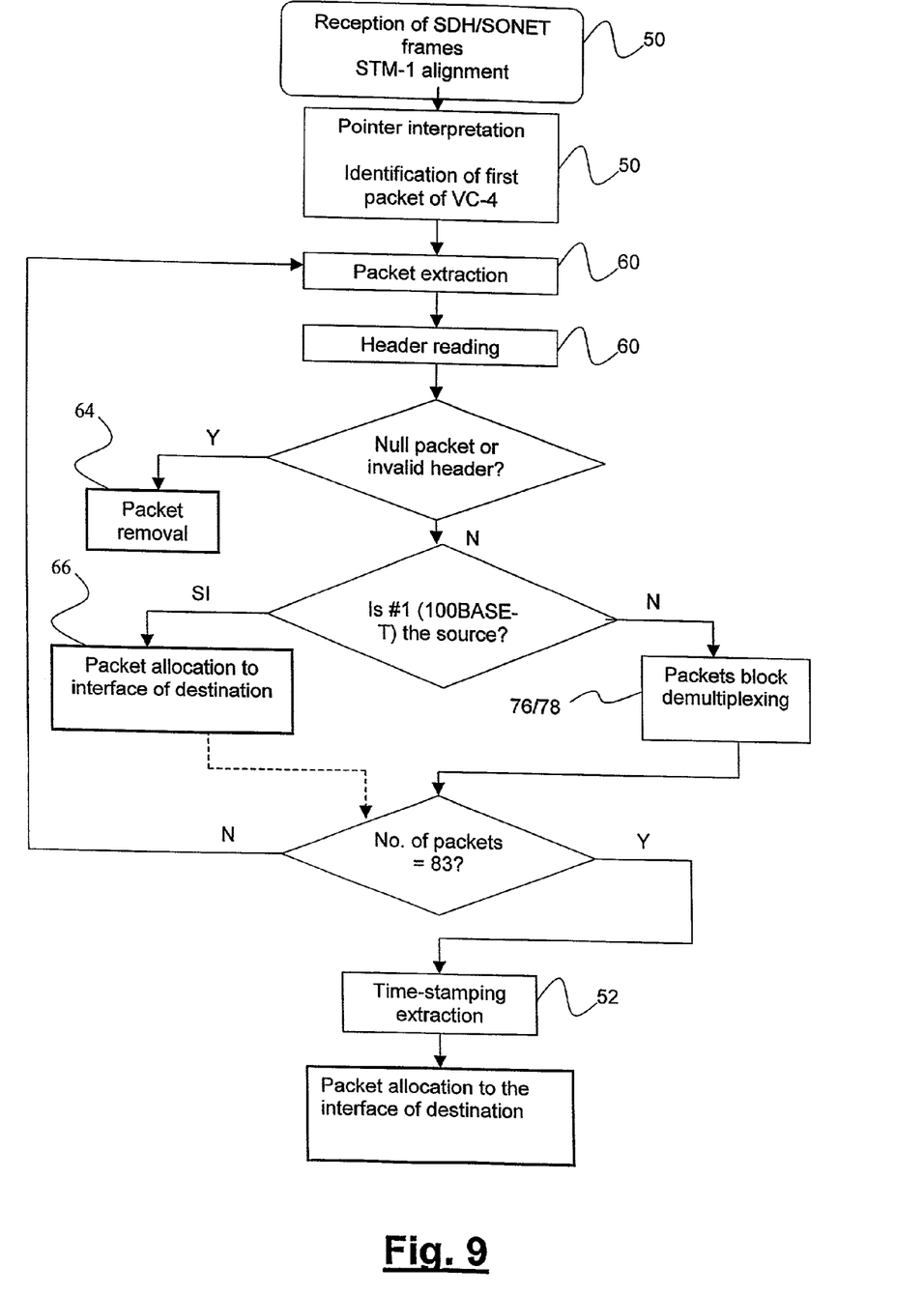
FIG. 9 illustrates a flowchart of the various steps of the method carried out at the reception side.

The flowcharts of the FIGS. 8 and 9 summarize the various steps of the method of the present invention, for transmission and reception, respectively.

The transmission steps can be summarized as follows:

12: receiving signals from the first source (100 BASE-T);

26: receiving signals from the second/third source (first/second block of E1 or DS1 signals);

22, 30: building packets having pre-established sizes (27 bytes);

38: building null packets having pre-established sizes (27 bytes);

24, 32, 40: adding a proper header identifying the source;

34: forming packet stacks by storing them into a buffer;

42: when a stack of packets is ready, inserting them and building the VC-4, otherwise completing the VC-4 by null packets;

20: inserting a time stamping into the VC-4 after checking that the number of packets in the VC-4 is equal to 83 (if the number of packets is lower than 83, returning to the formed stacks of packets).

The reception steps can be summarized as follows:

50: receiving of SDH/SONET frames, STM-1 aligning, pointer interpreting and identifying the first packet of VC-4;

60: extracting a packet and reading the header thereof;

64: eliminating the packet if the header is invalid or in case a null packet is identified;

66: if the header identifies a packet coming from the first source (100 BASE-T), allocating the packet at the corresponding interface;

76, 78: if the header identifies a packet coming from the second/third source (first/second block of E1 or DS1 signals), demultiplexing the block of packets;

52: if the number of packets is equal to 83, extracting the time stamping, otherwise, if the number of packets is lower than 83, extracting a new packet (60), identifying the corresponding header and prosecuting as above said.

There have thus been shown and described a novel method and a novel apparatus which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. A method for transmitting a Fast Ethernet signal through a point-to-point radio link communication system: the method comprising: receiving Fast Ethernet signals;
   re-packeting at least one of the Fast Ethernet signals, wherein said packeting comprises forming Fast Ethernet signal packets having a same format;
   receiving plesiochronous signals and 1brining corresponding plesiochronous signal packets having a format which is the same as the format of said Fast Ethernet signal packets;
   mapping one or more of the Fast Ethernet signal packets and one or more of plesiochronous signal packets directl3~into a single virtual container of a STM-1/OC-3 payload of a SDH/SONET frame signal; and
   transmitting said frame signal through the point-to-point radio link, wherein said point-to-point radio link is a point-to-point SDH/SONET radio link.

2. The method according to claim 1, further comprising adding a packet header to the Fast Ethernet signal packets for identifying the origin source.

3. The method according to claim 2, wherein said packeting comprises forming Fast Ethernet signal packets of 27-bytes and said adding a packet header comprises adding a 1-byte header.

4. The method according to claim 1, further comprising building stacks of the Fast Ethernet signal packets by storing a number of the packets into a buffer.

5. The method according to claim 1, thither comprising building null packets having a format which is the same as the format of said Fast Ethernet signal packets.

6. The method according to claim 5, wherein said building null packets comprises providing null packets having a corresponding header of null packets.

7. The method according to claim 1, further comprising adding a packet header to the plesiochronous signal packets for identifying the origin source and building stacks of the plesiochronous signal packets by storing a number of the plesiochronous signal packets into a buffer.

8. The method according to claim 6, wherein said mapping comprises inserting null packets in order to till said single virtual container.

9. The method according to claim 8, further comprising inserting a time stamp indicative of a sampling frequency and transmitting the time stamp together with the frame signal.

10. An apparatus for processing and transmitting a Fast Ethernet signal through a point-to-point radio link communication system, the apparatus comprising an interface for receiving said Fast Ethernet signal and wherein the apparatus further comprises:
   a device that re-packets a Fast Ethernet signal by forming Fast Ethernet signal packets having a same format;
   a device that receives plesiochronous signals and forms corresponding plesiochronous signal packets having a format which is the same as the format of said Fast Ethernet signal packets;
   a device that maps the Fast Ethernet signal packets and the plesiochronous signal packets directly into a single virtual container of a STM-1/OC-3 payload of a SDH/SONET frame signal; and
   a transmitter that transmits said from signal through the point-to-point radio link, wherein said point-to-point radio link is a point*to-point SDH/SONET radio link.

11. The apparatus according to claim 10, further comprising a device that adds a packet header to the Fast Ethernet signal packets for identifying the origin source.

12. The apparatus according to claim 10, further comprising a buffer which stores a number of the Fast Ethernet signal packets into a buffer.

13. The apparatus according to claim 10, hinter comprising a device that forms null packets having a second format which is the same as the format of said Fast Ethernet signal packets.

14. The apparatus according to claim 13, wherein said device that forms null packets provides null packets having a corresponding header of null packets.

15. The apparatus according to claim 10, further comprising a device that adds a packet header to the plesiochronous signal packets for identifying the origin source and stores a number of the plesiochronous signal packets into a buffer.

16. The apparatus according to claim 14, further comprising a device that inserts null packets in order to fill said single virtual container.

17. The apparatus according to claim 16, further comprising a device inserts a time stamp indicative of a sampling frequency and transmits the time stamp together with the signal frame.

* * * * *